F. L. G. KOLLMORGEN.
PERISCOPE.
APPLICATION FILED OCT. 28, 1909.
1,006,230.
Patented Oct. 17, 1911.
2 SHEETS—SHEET 1.
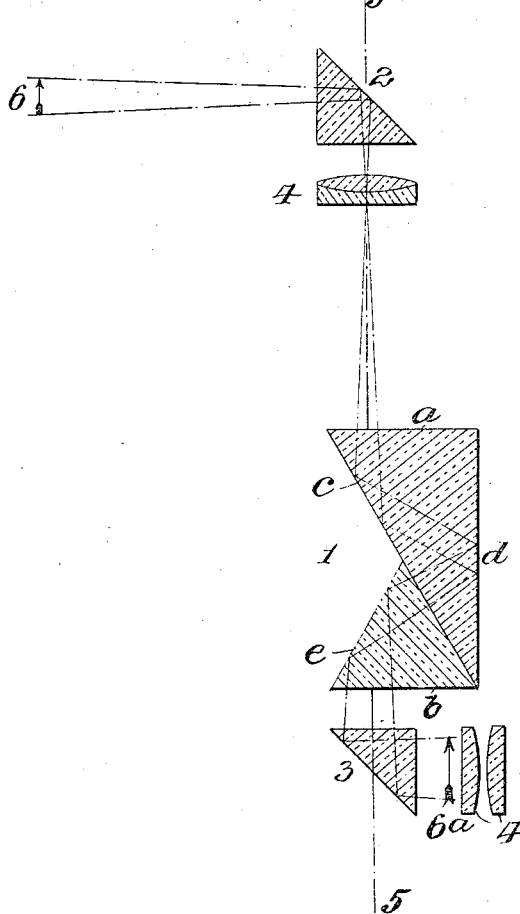
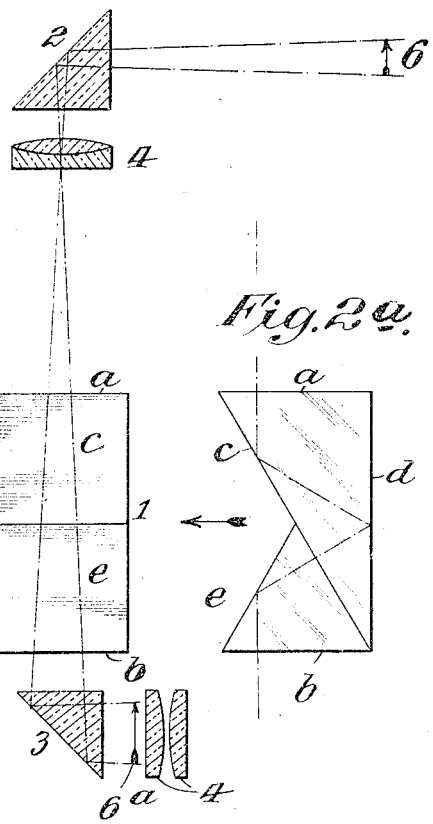
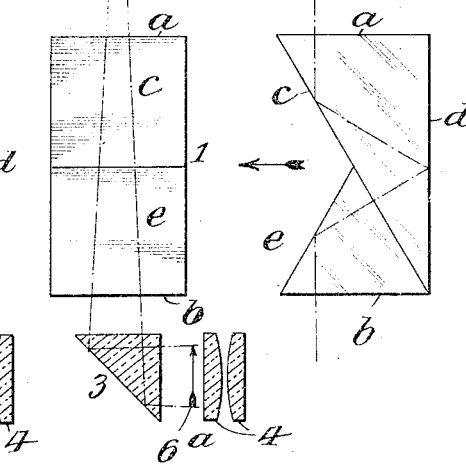
Attest:
Daisy Westervelt
Alan C. McDonnell
Frederick L. G. Kollmorgen, Inventor:
by William R. Baird
his Atty.

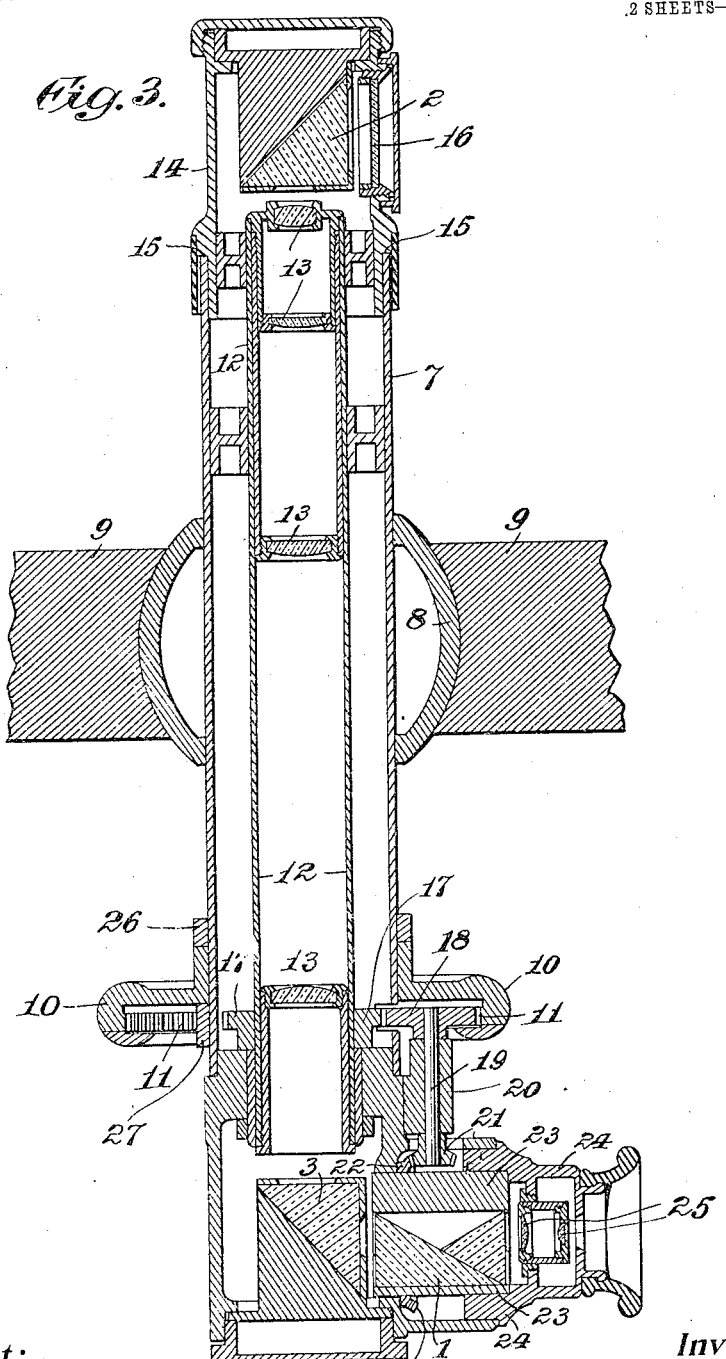

UNITED STATES PATENT OFFICE.

FREDERICK L. G. KOLLMORGEN, OF CALDWELL, NEW JERSEY, ASSIGNOR TO THE KEUFFEL & ESSER COMPANY, OF HOBOKEN, NEW JERSEY, A CORPORATION OF NEW JERSEY.

PERISCOPE.

1,006,230.

Specification of Letters Patent.

Patented Oct. 17, 1911.

Application filed October 28, 1909. Serial No. 525,013.

*To all whom it may concern:*

Be it known that I, FREDERICK L. G. KOLLMORGEN, a subject of the Emperor of Germany, and resident of Caldwell, Essex county, New Jersey, have invented certain new and useful Improvements in Periscopes, of which the following is a specification.

My invention relates to a reversing prism useful, for example, in connection with instruments known as periscopes or panoramic telescopes. Such telescopes have an objective reflector, generally a prism, which is rotatable by the observer so that he can view any and all parts of the horizon. These same telescopes are ordinarily provided with an eye-piece reflector, either a simple reflector or a prism, and with suitable lenses.

It is with instruments of this class that I have chosen to illustrate my inverting prism, although it will be understood that said prism may obviously have other applications.

The importance of the prism of my present invention in connection with periscopes is that it prevents the image from rotating during the described rotation of the objective reflector. In other words, the image remains erect in spite of the rotation of the objective reflector.

As a further advantage, the observer, in the use of a periscope provided with my inverting prism, is not obliged to change his position. Moreover, the image is free from astigmatism, independent of its position in the optical system.

These and other advantages will appear from an understanding of the following description in connection with the drawings, wherein—

Figures 1 and 2 are diagrammatic views of a periscope within my invention provided with my reversing prism, Fig. 2 showing the objective prism rotated at 180° and the reversing prism at 90° from their respective positions in Fig. 1; Fig. 2ª is a side view of the reversing prism of Fig. 2, looking in the direction of the arrow; and Fig. 3 shows in vertical section a working periscope embodying my invention.

In the drawings, 1 designates my inverting prism, 2 the rotating objective prism of the periscope, 3 a stationary eye-piece prism, and 4 lenses. As already indicated, these prisms may be replaced by mirrors or reflectors. If prisms be used, their inclined or hypotenuse sides are preferably silvered.

The lens system may be any desired, that shown in Figs. 1 and 2 representing a possible lens system of an ordinary astronomical telescope.

The particular form shown of my reversing prism is made up of two parts, one a larger prism having angles 90°, 60°, and 30°, and the other, a smaller equilateral prism having 60° angles. These two parts are suitably cemented together in the relation shown. The long side $d$ of the 90° prism is preferably silvered.

It will be noted that the reversing prism has two refracting surfaces $a$ and $b$ and three reflecting surfaces $c$, $d$ and $e$. The refracting surfaces are at right angles to the optical axis indicated by the dotted lines 5—5.

In Figs. 1 and 2, the course of the light rays is indicated by dotted lines. Thus, referring first to Fig. 1, the extreme rays from the object 6 are reflected downwardly by the hypotenuse side of the objective prism, thence these rays cross at the objective lens 4 and proceed to the reversing prism 1, which they enter without astigmatism through its first or entering refracting surface $a$, thence are reflected from surface $c$ to surface $d$ to surface $e$, and emerge from the second or exit refracting surface $b$, again without astigmatism. From the reversing prism the rays proceed to the eye-piece prism 3, whence they are reflected through the eye-piece lenses 4.

The observer, looking through the eye-piece, sees the image 6ª erect in Fig. 1, and therefore in proper correspondence with the object 6. This has been accomplished by the reversing prism 1, for without it, it is obvious that said image would be inverted. On the other hand, Fig. 2 shows the same combination except that the objective prism has been rotated 180° and the reversing prism 90°. Here it will be seen that the image would be erect, in spite of the presence of the reversing prism. Therefore, for this position of the objective prism relative to the eye-piece prism, the reversing prism must be prevented from acting to reverse the image. This is accomplished by rotating the reversing prism into a relatively neutral position which in this case is a position at 90° to its position in Fig. 1.

Figs. 2 and 2ª show the course of the light rays for the neutral position of the reversing prism, and it will be noted that said rays are merely reflected by the surfaces c, d and e without crossing. Consequently, the otherwise erect position of the image is not disturbed by the presence of the reversing prism.

It will be observed that the angular displacement of the reversing prism relative to the objective prism at which it is neutral and does not reverse the otherwise erect image, is an angular displacement of 90° compared to 180°. In short, by giving the reversing prism an angular displacement or speed of rotation one-half that of the objective prism, the reversing prism is active to maintain the erectness of the image whenever, without it, the phase of rotation of the objective prism would reverse the image, but is inert whenever the image is naturally erect.

Fig. 3 shows a practical working periscope embodying my reversing prism, wherein means is provided for automatically rotating the reversing prism at half speed, from the manual rotation of the objective prism. In this instrument, 1 designates the reversing prism, 2 and 3 the objective and eye-piece prisms respectively. 7 is a tube having a central spherical enlargement 8, by which the tube and incidentally the entire instrument is supported from the bearing 9, the latter, for example, being in the top of the turret of a battle-ship. In this way the instrument is supported in general vertical position with its objective end exposed. 10 is a hand-ring rotatably surrounding the tube 7 between collars 26 and 27 on said tube, and being internally geared at 11. Supported axially within the tube 7 is another tube 12 carrying the lenses 13, and having an extension or head 14 above the tube 7, said head having a flange 15 overhanging the upper edge of tube 7, thereby suspending the tube 12 and permitting its axial rotation within the tube 7. The aforesaid head 14 of the tube 12 carries the objective prism 2. The side of the head is open at 16. 17 is a gear on the tube 12, and 18 is an intermediate gear between said gear 17 and the gear 11 of the hand-ring 10. The intermediate gear 18 has a spindle 19 turning in a bearing 20 supported from the tube 7. Carried by this spindle is a gear 21, meshing with a gear 22 that surrounds and is carried by a cylindrical member 23 that carries the reversing prism 1. This cylindrical carrier 23 is mounted to rotate about its own axis within the eye-piece extension 24. It will be understood that the reversing prism 1 rotates with the cylindrical carrier 23 and has its optical axis at the axis of said carrier. 25 are eye-piece lenses at the outer end of the reversing prism.

The relations between the enumerated gears are such that as the operator turns the ring 10 to cause the objective prism 2 to sweep the horizon, he incidentally rotates the reversing prism, but at one-half the speed, with the result that the image viewed at the eye-piece 25 remains always erect, and this, without the observer shifting from his position at said eye-piece.

The reversing prism may be located between the objective and eye-piece, e. g., Figs. 1, 2 and 3, or outside of either the objective or eye-piece. Also it is immaterial whether the reversing prism be between the objective and eye-piece reflectors as in Figs. 1 and 2, or whether it be beyond one of said reflectors as in Fig. 3. In short, the reversing prism is free from astigmatism, and works equally well in parallel or non-parallel rays. This is because its refracting surfaces a and b are symmetrical for all points equidistant from the optical axis. Thus, in the particular prism shown, these refracting surfaces are both plane surfaces extending at right angles across the optical axis.

What I claim is:

1. In an optical instrument of the character described, the combination of an outer tube, a lens tube supported within the outer tube to be rotatable about its axis, lenses in said tube, a head carried on the upper end of the lens tube above the outer tube, said head having an opening in its side, an objective reflecting prism in the head arranged to reflect rays of light received through the side-opening in the head down the lens tube, an internally geared hand-ring rotatably supported on the lower end of the outer tube, an external gear surrounding the lens tube, an intermediate gear in mesh simultaneously with said internal and external gears, a spindle carrying said intermediate gear and itself turning in a bearing supported by the outer tube and extending in the same direction as the axis of said tube, another gear on the lower end of said spindle, an eye-piece extension projecting from the side of the lower end of the outer tube, a reversing prism, and a carrier for said prism rotatably supported in the axis of the eye-piece extension, a gear surrounding said carrier in mesh with the lower gear on the spindle, and an eye-piece prism in the lower end of the outer tube arranged to reflect the images received from the lens tube to the reversing prism in the extension eye-piece.

2. In an optical instrument of the character described, the combination of an outer tube, an eye-piece extension from the side of the lower end of said tube, a lens tube supported within the outer tube to be rotatable about its axis, a head on the lens tube projecting above the upper end of the outer tube and having sealing coöperation with said upper end, said head having an opening in one side, an objective prism in the head arranged to reflect the rays of light received through the side opening in the head down the lens tube, an eye-piece prism in the lower end of the outer tube arranged to reflect the images received from the lens tube into the eye-piece extension, a reversing prism within said eye-piece extension and rotatable axially therein, a hand-ring rotatably surrounding the outer tube, and gear connections between said ring and the lens tube and the rotatable reversing prism respectively which, from the turning of the hand-ring, effect simultaneous rotation at proper relative speed of the reversing prism and the lens tube and its carried parts.

3. In an optical instrument of the character described, the combination of an outer tube, a spherical enlargement on the middle portion of said tube which snugly, yet movably, fits a corresponding socket in the support through which the tube projects, an eye-piece extension from the side of the lower end of the outer tube, a lens tube supported within the outer tube to be rotatable about its axis, a head carried on the upper end of the lens tube and projecting above the upper end of the outer tube, said head having an opening in one side, an objective reflecting prism in the head arranged to reflect rays of light received through the side opening in the head down the lens tube, an eye-piece prism in the lower end of the outer tube arranged to reflect the images from the lens tube into the eye-piece extension, a reversing prism axially rotatable within the eye-piece extension, and hand-means which rotates simultaneously at the proper speed ratio the reversing prism and the lens tube with its carried parts.

Witness my hand this 22d day of October, 1909, at New York city, N. Y.

FREDERICK L. G. KOLLMORGEN.

Witnesses:
E. W. SCHERR, Jr.,
S. J. COX.